United States Patent
Brevick et al.

(10) Patent No.: US 9,939,044 B2
(45) Date of Patent: Apr. 10, 2018

(54) FLAT PLANE PENDULUM CARRIER FOR A CRANKSHAFT PENDULUM AND METHODS OF ATTACHMENT THERETO

(71) Applicant: Ford Global Technologies, LLC, Dearborn, MI (US)

(72) Inventors: John Edward Brevick, Livonia, MN (US); Jeffrey Eliot Chottiner, Farmington Hills, MI (US); Rick L. Williams, Canton, MI (US); Michael A. Kopmanis, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 14/698,960

(22) Filed: Apr. 29, 2015

(65) Prior Publication Data
US 2016/0319902 A1    Nov. 3, 2016

(51) Int. Cl.
F16F 15/26    (2006.01)
F16C 3/20    (2006.01)

(52) U.S. Cl.
CPC ............. *F16F 15/26* (2013.01); *F16C 3/20* (2013.01)

(58) Field of Classification Search
CPC .......... F16F 15/283; F16F 15/26; F16F 15/28; F16F 15/12353; F16F 15/34; F16F 2226/04; F16C 3/20
USPC ............................................. 123/192.2, 192.1
See application file for complete search history.

(56) References Cited

U.S. PATENT DOCUMENTS

| | | | | |
|---|---|---|---|---|
| 2,344,430 A | * | 3/1944 | Vaughan | F16F 15/14 74/604 |
| 5,203,230 A | * | 4/1993 | Distelrath | F16C 3/08 74/595 |
| 5,931,052 A | * | 8/1999 | Zhao | F16F 15/315 123/192.1 |
| 6,688,272 B2 | * | 2/2004 | Brevick | F02B 75/22 123/192.2 |
| 8,813,605 B2 | * | 8/2014 | Wakeman | F16C 3/14 123/192.2 |
| 2003/0183187 A1 | * | 10/2003 | Menzel | F02B 63/02 123/192.2 |
| 2009/0000589 A1 | * | 1/2009 | Weinzierl | F02B 75/06 123/192.2 |

(Continued)

*Primary Examiner* — Long T Tran
(74) *Attorney, Agent, or Firm* — LeClairRyan (57) ABSTRACT

A pendulum absorber fixed to the crankshaft of an engine comprises a pendulum and a pendulum carrier attached to the pendulum carrier attachment boss of the crankshaft. The first preferred embodiment provides a crankshaft web having spaced apart part pendulum carrier attachment bosses that define a carrier groove. The second preferred embodiment provides an arrangement similar to that of the first embodiment but the attachment bosses extend further away from the web. The third preferred embodiment provides a pendulum carrier having a flat portion and a cylindrical portion. The fourth preferred embodiment provides a carrier engagement portion that includes a deck and two lateral attachment bosses having curved surfaces. The carrier includes two outwardly-extending attachment arms. The fifth preferred embodiment provides a web having a pendulum carrier engagement portion that includes a machined groove and machined attachment bosses. The pendulum carrier includes attachment arms that engage the machined attachment bosses.

19 Claims, 10 Drawing Sheets

(56) References Cited

U.S. PATENT DOCUMENTS

2014/0053680 A1* 2/2014 Wakeman ................. F16C 3/14
74/604
2015/0219184 A1* 8/2015 Brevick .................... F16C 3/06
74/604

* cited by examiner

FLAT PLANE PENDULUM CARRIER FOR A CRANKSHAFT PENDULUM AND METHODS OF ATTACHMENT THERETO

TECHNICAL FIELD

The disclosed inventive concept relates generally to absorbers to reduce torsional vibration in an internal combustion engine. More particularly, the disclosed inventive concept relates to arrangements for attaching the absorbers in the form of pendulums to a crankshaft.

BACKGROUND OF THE INVENTION

Internal combustion engines having a relatively small number of cylinders provide automobile makers with an attractive response to the need for improved fuel economy. In order to compensate for a reduction of cubic engine capacity, vehicle manufacturers developed technologies to improve engine power, such as direct fuel injection, turbocharging, and variable timing for inlet and exhaust camshafts. In this way six- and eight-cylinder engines can be scaled down without losing available horsepower.

An undesirable consequence of engines with a small number of cylinders is high crankshaft torsional vibration and high engine block vibration caused by forces, such as first and second order forces, that are not cancelled. Such vibrations are ultimately transmitted through the engine mounts and driveline to the vehicle structure.

Engineers managed these vibrations to one extent or another through a variety of approaches, many of which increase the cost of construction and reduce fuel economy. One accepted solution to overcome excessive vibration is the provision of one or more pendulums on the crankshaft to lower the torsional vibration of the crankshaft and the consequent driveline vibration. Such crankshaft-mounted pendulums function as vibration absorbers as they are tuned to address and thus cancel out vibrations generated by crankshaft rotation, thus smoothing torque output of the crankshafts. This approach is taken as well by designers of some airplane piston engines where the pendulums smooth output torque and reduce rigid body motion.

Pendulum vibration absorbers are attached to the engine crankshaft web using pendulum carriers. The pendulum carriers are themselves attached to the crankshaft web according to a wide variety of attachment methods, including mechanically fastening. In many instances, the crankshaft itself requires excessive machining to accommodate the pendulum carrier.

While the concept of attaching a pendulum to a crankshaft provides smoother engine performance, known methods of attaching the crankshaft pendulum carrier to the crankshaft are overly complex, resulting in either expensive pendulum carrier production or expensive crankshaft preparation or both. Accordingly, a new approach to the attachment of the pendulum carrier to the crankshaft web is needed to address the problems associated with known arrangements without compromising the desired reduction of torsional vibration produced by the internal combustion engine.

SUMMARY OF THE INVENTION

The different embodiments of the disclosed inventive concept provide practical and cost-effective solutions to the challenges faced when attaching a pendulum carrier to a crankshaft according to known approaches. Each of the various embodiments illustrated and described herein provides an advantage over the prior art by simplifying methods of attachment without compromising operating performance of the crankshaft pendulum.

The first preferred embodiment of the disclosed inventive concept provides a crankshaft web having spaced apart pendulum carrier attachment bosses that define a carrier groove. The pendulum carrier is fitted into the groove and is mechanically attached to the web by, for example, pressed-in pins. A long drill is used to form attachment holes in the pendulum carrier attachment bosses.

The second preferred embodiment of the disclosed inventive concept provides an arrangement similar to that of the first preferred embodiment but the pendulum carrier attachment bosses extend further away from the crankshaft web so as to avoid the possibility of drilling into the thrust face of the crankshaft during production.

The third preferred embodiment of the disclosed inventive concept provides a pendulum carrier having a flat portion and a cylindrical portion. The crankshaft web includes an attachment groove having a cylindrical portion. The pendulum carrier is inserted into the attachment groove such that the cylindrical portion of the carrier fits within the cylindrical portion of the attachment groove. The cylindrical portion of the pendulum carrier includes an end cap that restricts movement within the attachment groove. A fastener such as a bolt is installed at the opposite end of the pendulum carrier to fix it to the crankshaft web.

The fourth preferred embodiment of the disclosed inventive concept eliminates the need for machining a groove into the crankshaft web by providing a carrier engagement portion that includes a deck and two lateral attachment bosses having curved surfaces. The pendulum carrier includes two attachment arms that extend outward from the carrier for engagement with the engagement portion of the crankshaft web. A mechanical fastener, such as bolt, is used to lock the pendulum carrier against the attachment bosses of the carrier engagement portion. The curved surfaces of the attachment bosses carry the load of the pendulum assembly. No drilling of the web is required.

The fifth preferred embodiment of the disclosed inventive concept includes a crankshaft web having a pendulum carrier engagement portion. The pendulum carrier engagement portion includes a machined groove and machined attachment bosses. The pendulum carrier includes attachment arms that extend downward for engagement with the machined attachment bosses of the pendulum carrier engagement portion of the crankshaft web.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 6:
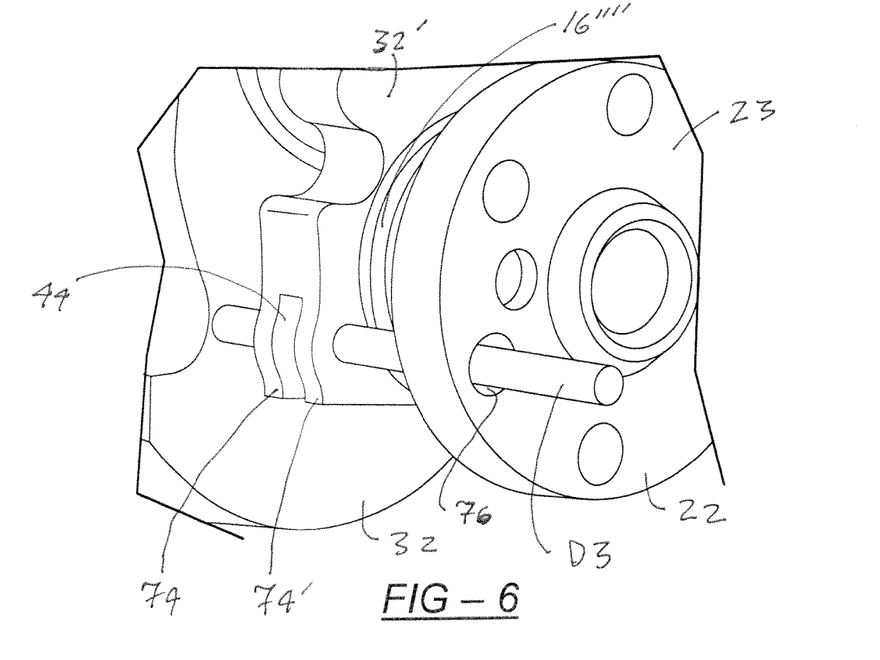
FIG. 6 is a close up view of a portion of the crankshaft shown in FIG. 1 illustrating a single drill path dictated by the flywheel bolt holes.
Figure 7:
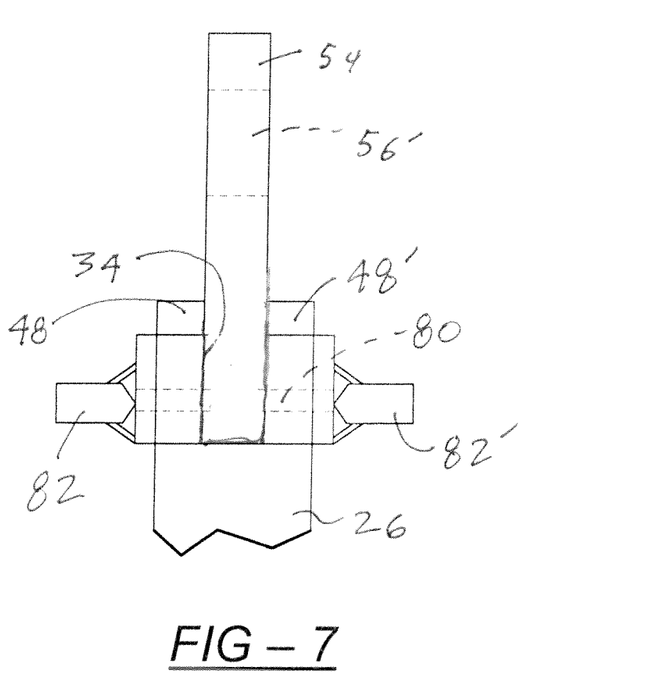
FIG. 7 is a partial end view of the intersection of a portion of the pendulum carrier according to the first embodiment of the disclosed inventive concept fitted into the pendulum carrier groove of a crankshaft in which a method of attaching the pendulum carrier to the crankshaft is illustrated.
Figure 8:
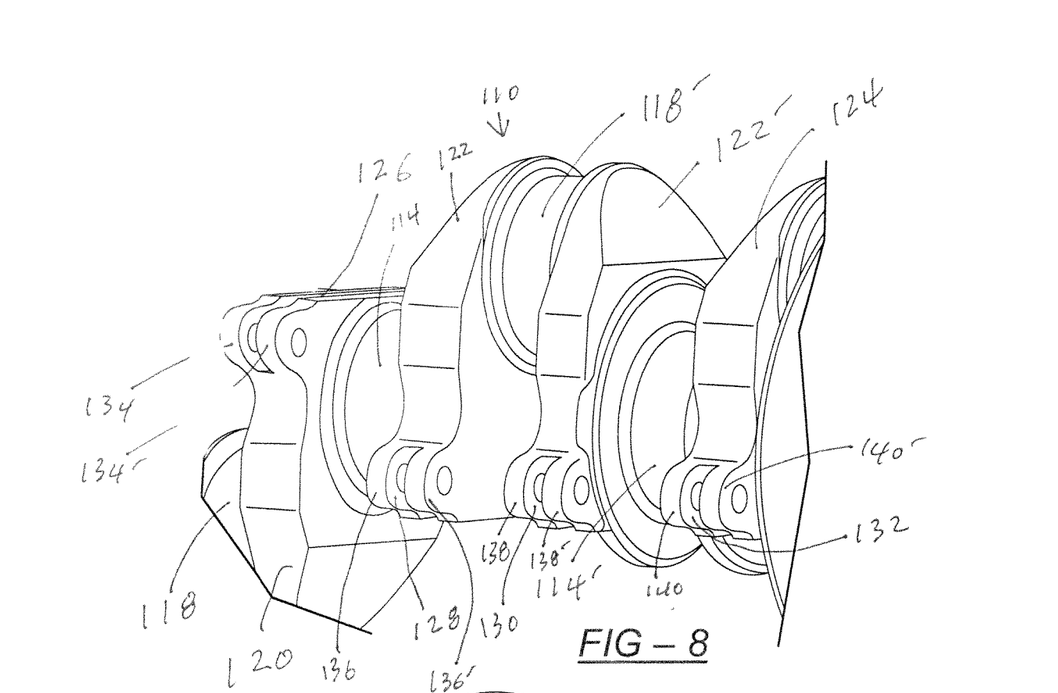
FIG. 8 is a close up view of a portion of the crankshaft illustrating a second preferred embodiment of the disclosed inventive concept in which the pendulum attachment bosses have been extended from the crankshaft webs compared with the position of the bosses in the first preferred embodiment of the disclosed inventive concept.
Figure 9:
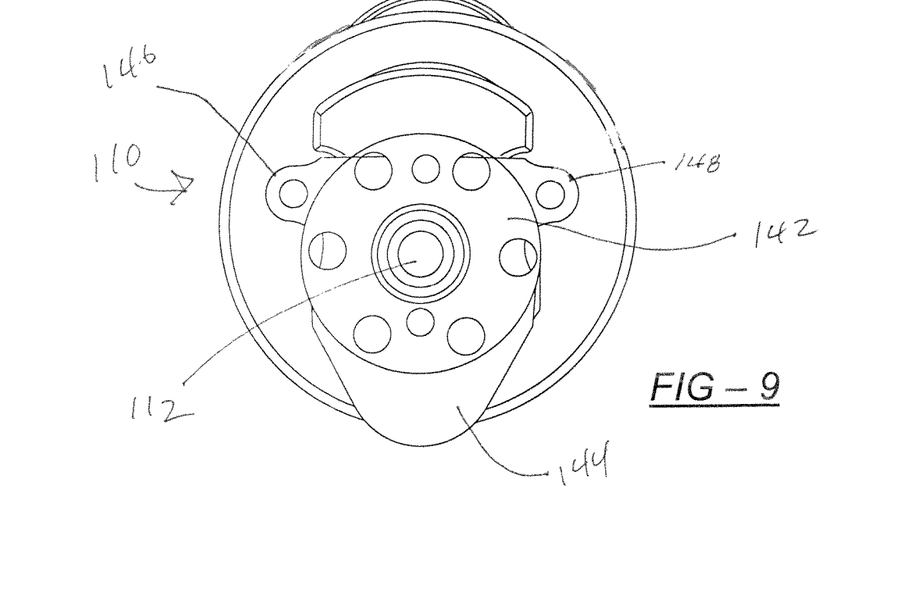
FIG. 9 is an end view of the second preferred embodiment of the disclosed inventive concept illustrated in FIG. 8.
Figure 13:
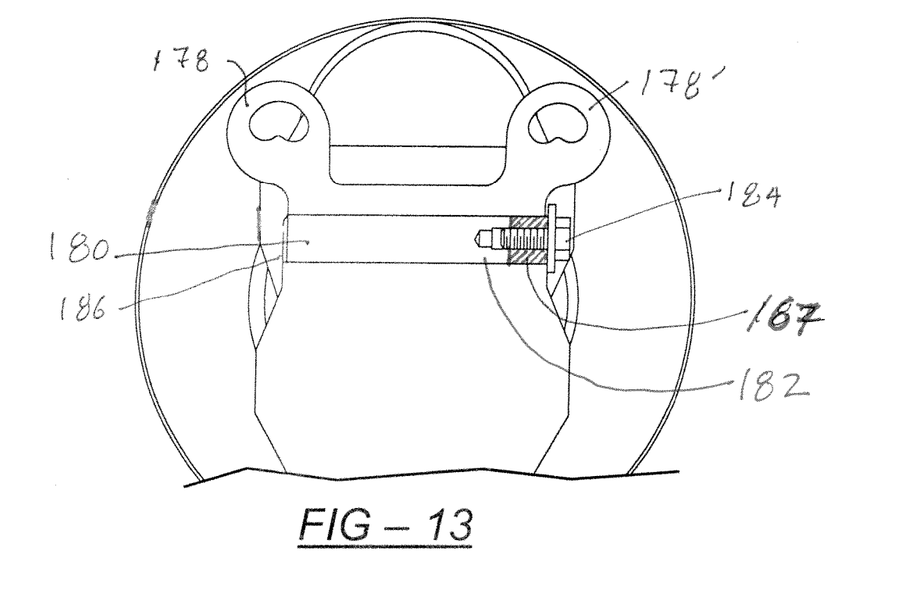
FIG. 13 is a side view of the pendulum carrier fitted to a crankshaft according to the third preferred embodiment of the disclosed inventive concept.
Figure 14:
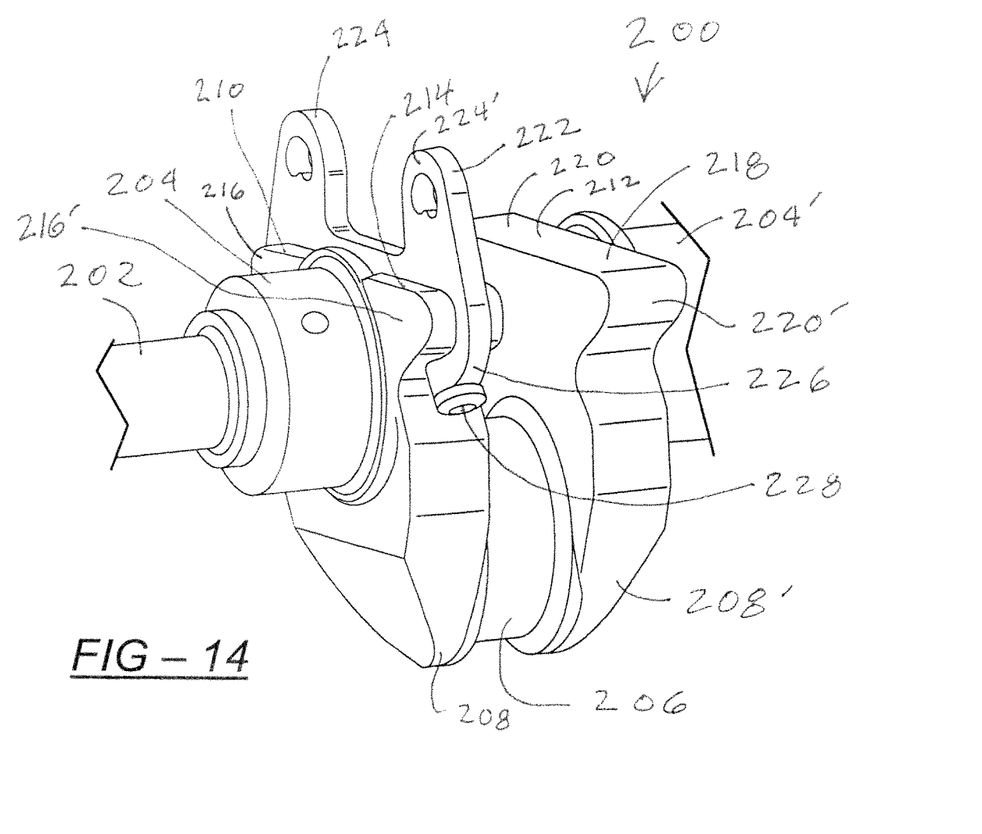
FIG. 14 illustrates a perspective view of a portion of a crankshaft having a pendulum carrier attached thereto according to a fourth preferred embodiment of the disclosed inventive concept.

The figures illustrate five preferred embodiments of the disclosed inventive concept. Particularly, FIGS. 1 through 7 illustrate a first preferred embodiment of the disclosed inventive concept. FIGS. 8 and 9 illustrate a second preferred embodiment of the disclosed inventive concept. FIGS. 10 through 13 illustrate a third preferred embodiment of the disclosed inventive concept. FIG. 14 illustrates a fourth preferred embodiment of the disclosed inventive concept. And FIGS. 15 through 18 illustrate a fifth preferred embodiment of the disclosed inventive concept. It is to be understood that the overall configurations of the illustrated crankshaft assemblies shown in the figures is set forth for suggestive purposes only as the overall configuration may be altered from those illustrated without deviating from the spirit or scope of the invention.

First Embodiment

Figure 1:
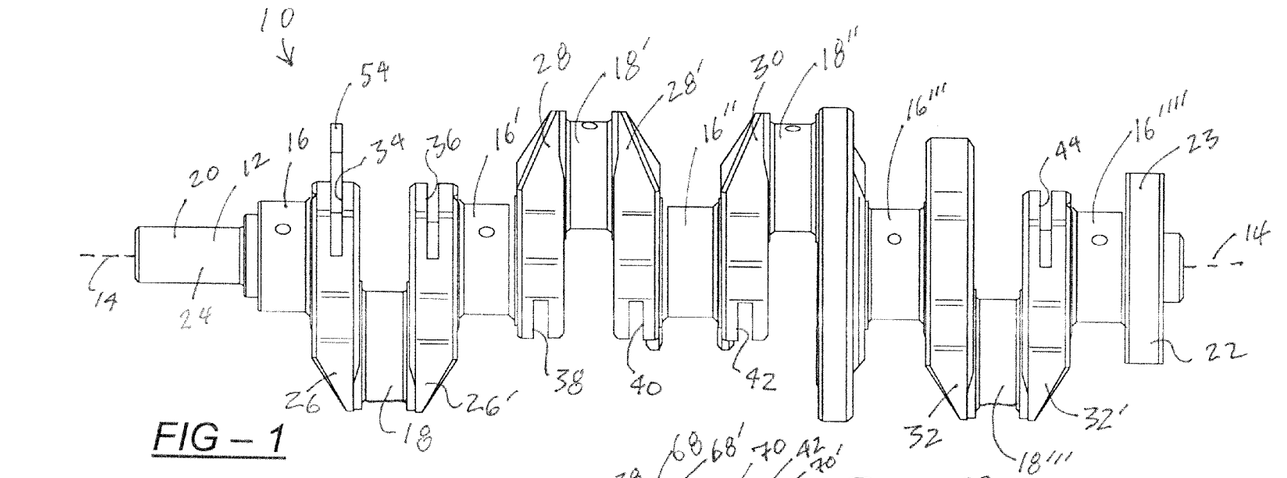
FIG. 1 is a side elevational view of a crankshaft having an arrangement for attaching pendulum carriers thereto according to a first preferred embodiment of the disclosed inventive concept.

Referring to FIG. 1, a side view of a crankshaft assembly having a pendulum and pendulum carrier according to a first embodiment of the disclosed inventive concept is illustrated. The crankshaft assembly, generally illustrated as 10, includes a crankshaft 12 having a rotational axis 14. Rotation of the crankshaft 12 about its rotational axis 14 is made possible by the provision of main journals 16, 16', 16", 16''' and 16''''. The journals 16, 16', 16", 16''' and 16'''' are integrally formed as part of the crankshaft 12 and are restrained within the engine block (not shown) by crankshaft bearings (not shown).

The connecting rods (not shown) are attached as is known in the art to rod journals 18, 18', 18", and 18''' by rod bearings (not shown). The rod journals 18, 18', 18", and 18''' are integrally formed on the crankshaft 12, again as is known in the art.

The crankshaft 12 includes a first end 20 and a second end 22. Conventionally provided extending from one end, in this case from the first end 20, is a post 24. The post 24 serves as a mount for any number of engine components, such as a fan belt pulley and a drive mechanism for a camshaft. These components are not shown but these components and their methods of attachment are known to those skilled in the art.

Conventionally attached to the other end of the crankshaft 12, in this case from the second end 22, is a flywheel (not shown) that attaches to the flywheel flange 23. The flywheel, which assists in reducing torsional fluctuations in the crankshaft 12, is in operative engagement with the drive shaft or transaxle of the vehicle.

To each side of the rod journal 18 is provided a spaced apart pair of crankshaft webs 26 and 26'. To each side of the rod journal 18' is provided a spaced apart pair of crankshaft webs 28 and 28'. To one side of the rod journal 18" is provided a crankshaft web 30. To each side of the rod journal 18''' is provided a spaced apart pair of crankshaft webs 32 and 32'.

The crankshaft webs include grooves for attachment of pendulum carriers according to the disclosed inventive concept. Particularly, a pendulum carrier attachment groove 34 is formed at one end of the crankshaft web 26. A pendulum carrier attachment groove 36 is formed at one end of the crankshaft web 26'. A pendulum carrier attachment groove 38 is formed at one end of the crankshaft web 28. A pendulum carrier attachment groove 40 is formed at one end of the crankshaft web 28'. A pendulum carrier attachment groove 42 is formed at one end of the crankshaft web 30. And a pendulum carrier attachment groove 44 is formed at one end of the crankshaft web 32'.

Figure 2:
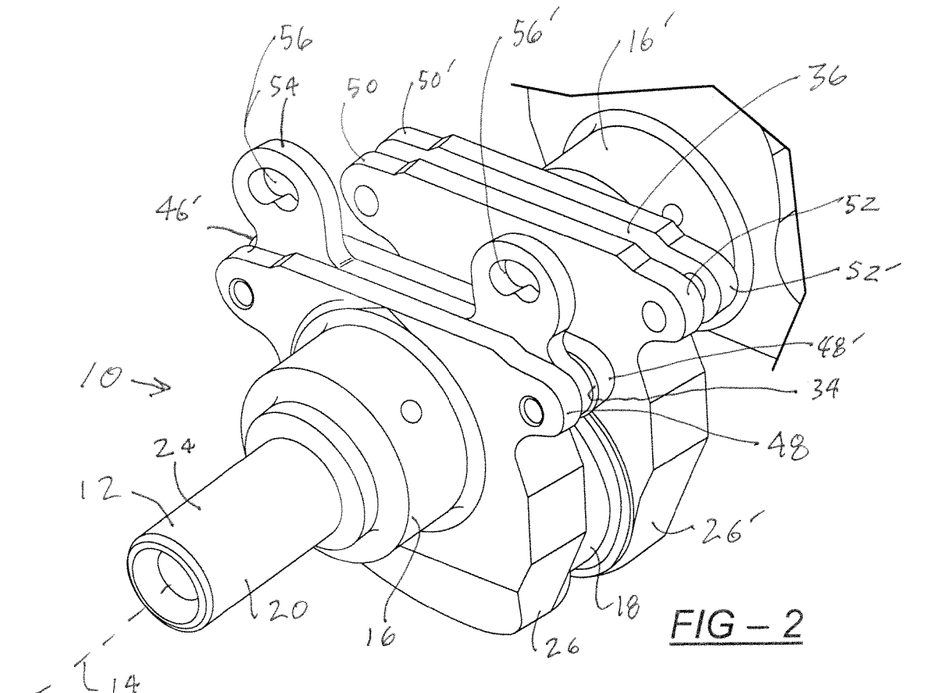
FIG. 2 is a perspective view of a portion of the crankshaft shown in FIG. 1.

FIG. 2 illustrates details of the arrangement for attaching a crankshaft pendulum carrier to a crankshaft according to a first embodiment of the disclosed inventive concept. Extending from the crankshaft web 26 is a first pair of spaced part pendulum carrier attachment bosses 46 and 46'. Also extending from the crankshaft web 26 is a second pair of spaced part pendulum carrier attachment bosses 48 and 48'. The pendulum carrier groove 34 is formed between the pendulum carrier attachment bosses 46 and 46' and the bosses 48 and 48'. Extending from the crankshaft web 26' is a first pair of spaced part pendulum carrier attachment bosses 50 and 50'. Also extending from the crankshaft web 26' is a second pair of spaced part pendulum carrier attachment bosses 52 and 52'. The pendulum carrier groove 36 is formed between the pendulum carrier attachment bosses 50 and 50' and the bosses 52 and 52'. Pendulum carrier attachment bosses are also formed on the crankshaft webs 28, 28', 30, and 32'.

Figure 3:
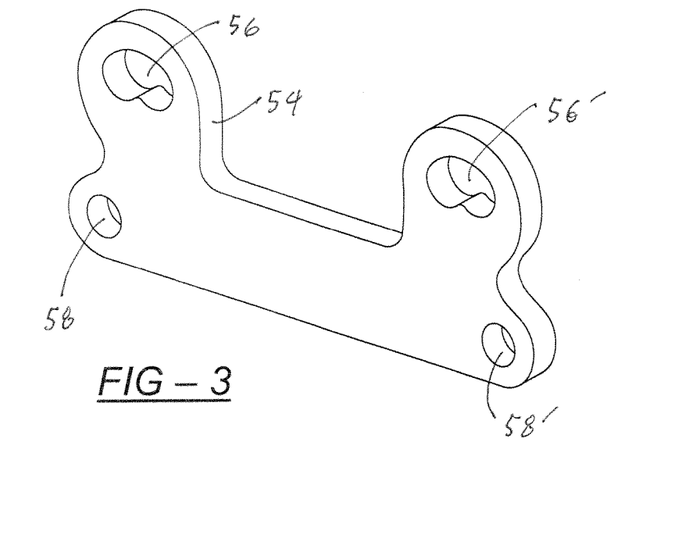
FIG. 3 is a perspective view of a pendulum carrier for use with the crankshaft shown in FIG. 1 according to the first preferred embodiment of the disclosed inventive concept.

A pendulum carrier 54, shown attached to the crankshaft web 26 in FIGS. 1 and 2 and by itself in FIG. 3, is positioned within the pendulum carrier groove formed in the crankshaft web. The pendulum carrier 54 is of a one plane, one-piece, flat design and can thus be inexpensively and easily manufactured by cold forming or other stamping techniques. A crankshaft pendulum (not shown) is movably attached to the pendulum carrier 54.

A pair of kidney-shaped cycloid pathways 56 and 56' is formed either during the cold forging process or by machining in the pendulum carrier 54. Pendulum rollers (not shown) are provided in the cycloid pathways 56 and 56'. A pair of fastener holes 58 and 58' for attachment to the pendulum carrier attachment bosses are formed in the pendulum carrier 54.

Figure 4:
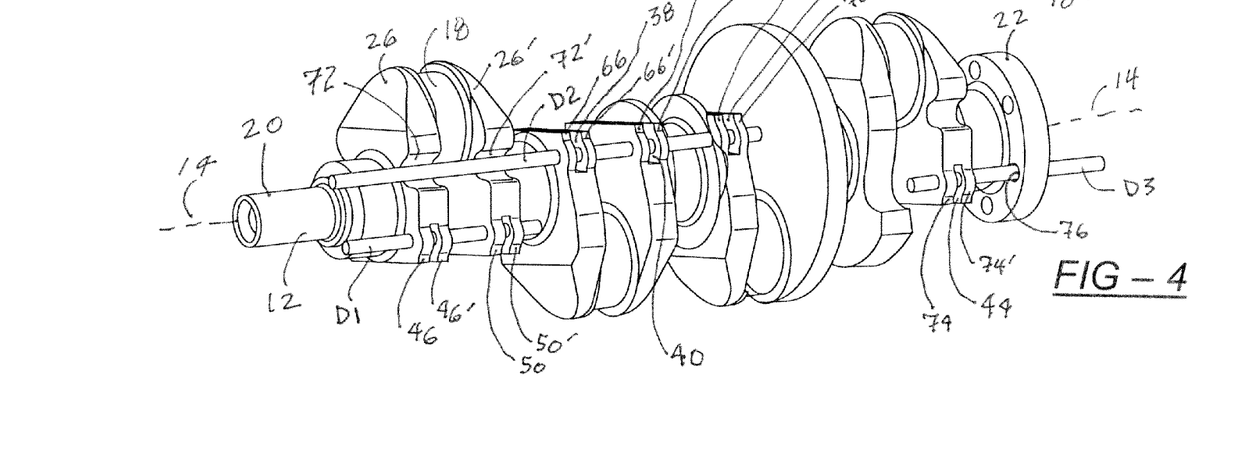
FIG. 4 is a perspective view of the crankshaft of FIG. 1 illustrating the drill paths through the thrust faces required to form the attachment holes for mechanically fastening the pendulum carriers to the crankshaft according to the embodiment of FIG. 1.
Figure 5:
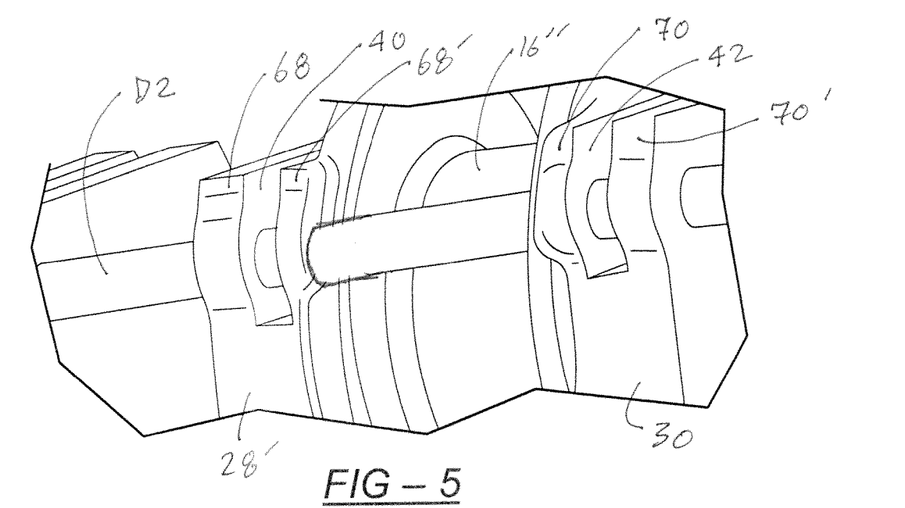
FIG. 5 is a close up view of a portion of the crankshaft shown in FIG. 1 illustrating a single drill path.

The pendulum carriers 54 are attached to the crankshaft 12 by fasteners, such as rivets or other mechanical fasteners, as will be discussed below relative to FIG. 9. Proper alignment of the fastener holes through the webbing and the pendulum carriers is desired. FIGS. 4 through 6 illustrate the drill paths needed for the formation of properly aligned fastener holes.

Referring to FIGS. 4 through 6, a first drill path D1 is formed through the pendulum carrier attachment bosses 46, 46', 50 and 50' during the manufacturing process of the crankshaft 12. A second drill path D2 is formed during the manufacturing process through a pair of opposed pendulum carrier attachment bosses 66 and 66' between which the pendulum carrier attachment groove 38 is formed, through a pair of opposed pendulum carrier attachment bosses 68 and 68' through which the pendulum carrier attachment groove 40 is formed, and through a pair of opposed pendulum carrier attachment bosses 70 and 70' through which the pendulum carrier attachment groove 42 is formed. An indented area 72 is formed on the web 26 to allow for the passage of a drill bit (not shown) along the drill path D2. In addition, an indented area 72' is formed on the web 26' to allow for the passage of the same drill bit (not shown) along the drill path D2.

A third drill path D3 is formed through a pair of opposed pendulum carrier attachment bosses 74 and 74' between which the pendulum carrier attachment groove 44 is formed and through a bolt hole 76 formed through the flywheel flange 23. While drill paths D1, D2 and D3 are illustrated, it is to be understood that a like number of drill paths exist symmetrically on the far side of the crankshaft in the same but opposite positions as drill paths D1, D2 and D3.

Each pendulum carrier is attached to a pendulum carrier attachment boss formed on the crankshaft webs by elongated, mechanical fasteners positioned through the pendulum carriers and into the pendulum carrier attachment bosses. Particularly, and as illustrated in FIG. 7, the pendulum carrier 54, fitted into the pendulum carrier groove 34, is attached to the spaced part pendulum carrier attachment bosses 48 and 48' by a mechanical fastener, such as a pressed-in pin 80. The pressed-in pin 80 passes through holes formed in the pendulum carrier attachment bosses 48 and 48'. The pressed-in pin 80 may be of a variety of diameters, though a non-limiting diameter may be 8.0 mm. The pressed-in pin 80 is pressed in to assure good attachment by way of an interference fit. This method of attachment, coupled with the tight fit of the pendulum carrier 54 to the pendulum carrier attachment web 26, restricts movement of the pendulum assembly relative to the crankshaft 12.

A number of tools may be used for pressing the pressed-in pin 80 through the holes formed the pendulum carrier attachment bosses 48 and 48'. One such tool is a crimping tool having crimps 82 and 82' that simultaneously apply pressure to the inserted pin 80. This approach is suggestive and is not intended as being limiting.

Second Embodiment

The manufacturing challenge of the first embodiment discussed above is that the formation of the holes needed for fastening the pendulum carrier to the crankshaft web may result in the drill contacting and possibly passing through the crankshaft thrust face. This is particularly the case when the operator relies on the flywheel flange 23 when following the third drill path D3 as shown in FIG. 6.

A solution to this challenge is illustrated in FIGS. 8 and 9 in which a second preferred embodiment of the disclosed inventive concept is illustrated.

Referring to FIG. 8, a perspective view of a crankshaft assembly having a pendulum and pendulum carrier according to a second embodiment of the disclosed inventive concept is illustrated. The crankshaft assembly, generally illustrated as 110, includes a crankshaft 112 having main journals 114 and 114'. The main journals 114 and 114' are integrally formed as part of the crankshaft 112 and are restrained within the engine block (not shown) by crankshaft bearings (not shown). The connecting rods (not shown) are attached as is known in the art to connecting rod journals 118 and 118' by rod bearings (not shown). The connecting rod journals 118 and 118' are integrally formed on the crankshaft 112, again as is known in the art.

To one side of the main journal 114 is provided a crankshaft web 120. To each side of the connecting rod journal 118' is provided a spaced apart pair of crankshaft webs 122 and 122'. To one side of the main journal 114" is provided a crankshaft web 124.

The crankshaft webs include grooves for attachment of pendulum carriers according to the disclosed inventive concept. Particularly, a pendulum carrier attachment groove 126 is formed at one end of the crankshaft web 120. A pendulum carrier attachment groove 128 is formed at both ends of the crankshaft web 122. A pendulum carrier attachment groove 130 is formed at both ends of the crankshaft web 122'. A pendulum carrier attachment groove 132 is formed at both ends of the crankshaft web 124.

Extending from the crankshaft web 120 is a first pair of extended, spaced part pendulum carrier attachment bosses 134 and 134'. Extending from the crankshaft web 122 is a pair of extended, spaced part pendulum carrier attachment bosses 136 and 136'. Extending from the crankshaft web 122' is a pair of extended, spaced apart pendulum carrier attachment bosses 138 and 138'. Extending from the crankshaft web 124 is a pair of extended, spaced apart pendulum carrier attachment bosses 140 and 140'.

FIG. 9 illustrates an end view of the crankshaft assembly 110. The end of the crankshaft 112 includes flywheel flange 142 to which the flywheel (not shown) is attached. Behind the flywheel flange 142 is a crankshaft web 144 that includes a first extended pendulum carrier attachment boss 146 and a second extended pendulum carrier attachment boss 148.

As illustrated in FIGS. 8 and 9, the extended attachment bosses enable the manufacturer to drill the holes needed for the mechanical fasteners without contacting the thrust face of the crankshaft.

Third Embodiment

Figure 10:
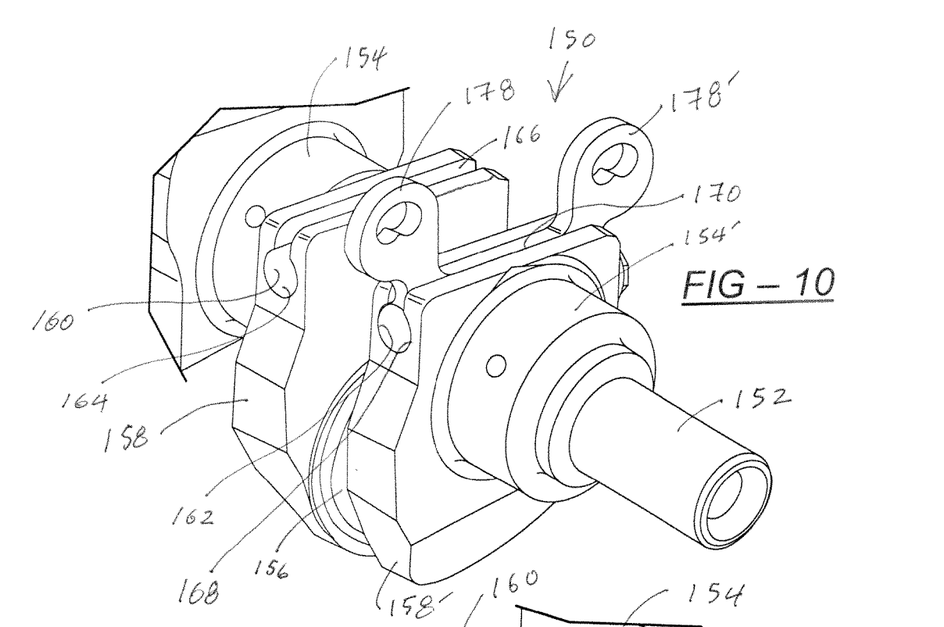
FIG. 10 illustrates a perspective view of a portion of a crankshaft having a pendulum carrier attached thereto according to a third preferred embodiment of the disclosed inventive concept viewed from the end cap side.
Figure 11:
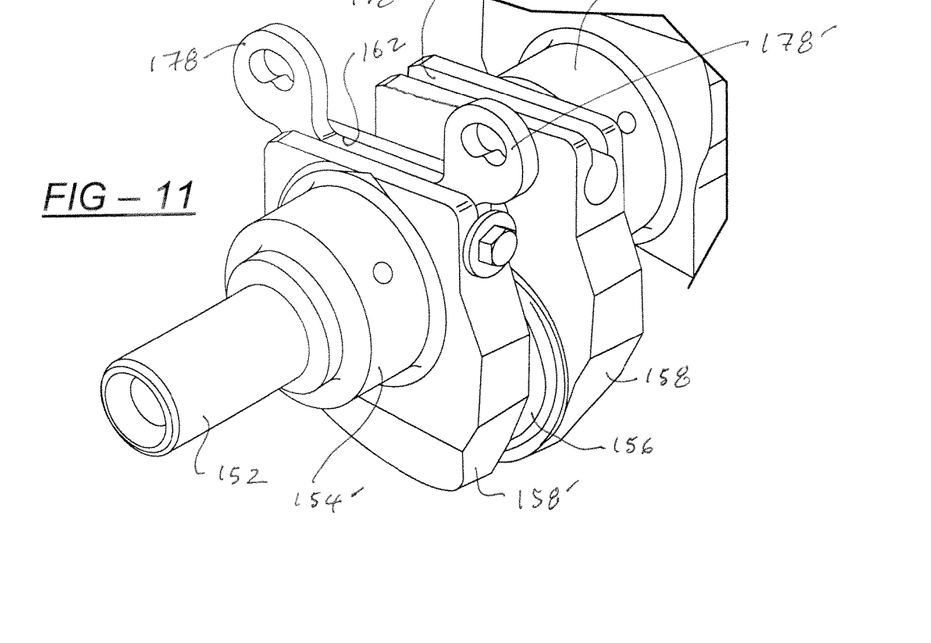
FIG. 11 illustrates a perspective view of a portion of a crankshaft having a pendulum carrier attached thereto according to the third preferred embodiment of the disclosed inventive concept viewed from the fastener side.

FIGS. 10 through 13 illustrate a third embodiment of the disclosed inventive concept for attaching a crankshaft pendulum carrier to a crankshaft. Referring to FIGS. 10 and 11, perspective views of a crankshaft assembly having a pendulum and pendulum carrier according to a third embodiment of the disclosed inventive concept is illustrated. The crankshaft assembly, generally illustrated as 150, includes a crankshaft 152 having main journals 154 and 154'. The main journals 114 and 114' are integrally formed as part of the crankshaft 112 and are restrained within the engine block (not shown) by crankshaft bearings (not shown). A connecting rod (not shown) is attached as is known in the art to a connecting rod journal 156 by a rod bearing (not shown).

To each side of the connecting rod journal 156 is provided a spaced apart pair of crankshaft webs 158 and 158'. The crankshaft webs 158 and 158' include grooves for attachment of pendulum carriers according to the disclosed inventive concept. Particularly, a pendulum carrier attachment groove 160 is formed at one end of the crankshaft web 158. A pendulum carrier attachment groove 162 is formed at one end of the crankshaft web 158'.

The pendulum carrier attachment groove 160 includes a cylindrical portion 164 and a slotted portion 166. The pendulum carrier attachment groove 162 includes a cylindrical portion 168 and a slotted portion 170. The cylindrical portion 168 includes an internal shoulder 167 (shown in sectional view in FIG. 13).

Figure 12:
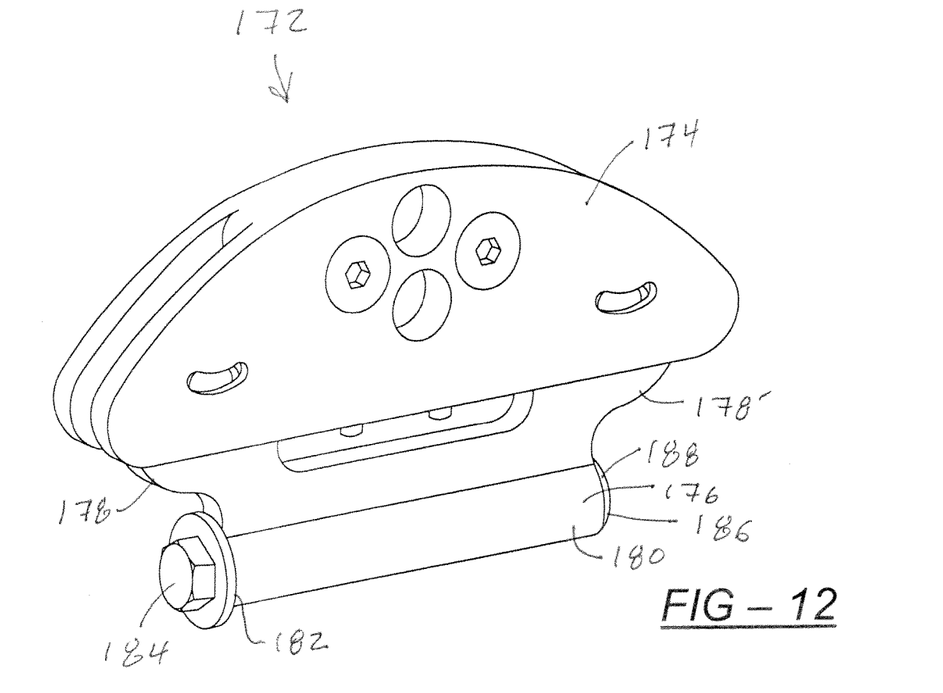
FIG. 12 is a perspective view illustrating a pendulum attached to the pendulum carrier of the third preferred embodiment of the disclosed inventive concept.

FIG. 12 illustrates a pendulum assembly 172 for use with the crankshaft assembly 150 of the third preferred embodiment of the disclosed inventive concept. The pendulum assembly 172 includes a pendulum 174 and a pendulum carrier 176 to which the pendulum 174 is movably attached. The pendulum carrier 176 includes a pair of pendulum attachment ears 178 and 178' (illustrated in FIGS. 10, 11 and 13) and a cylindrical attachment body 180. The cylindrical attachment body 180 is either integrally formed with the pendulum carrier 176 by cold forging or may be attached to a flat stamping by welding. The attachment body 180 includes a bolt end 182 having a bolt 184 and a cap end 186.

To install the pendulum carrier 176 into the pendulum carrier attachment channel, the attachment body 180 is inserted bolt end 182 first into the groove until the bolt end 182 abuts the internal shoulder 167. The installer then installs the bolt 184 into the bolt end 182, thus fixing the pendulum carrier relative to the crankshaft web. In operation, the operating load is carried by the upper portion of the cylindrical attachment body 180. The third preferred embodiment of the disclosed inventive concept provides a simple and inexpensive solution to the challenge of attaching a pendulum carrier to a crankshaft web without the need of long drilling of the crankshaft itself.

Fourth Embodiment

FIG. 14 illustrates a fourth embodiment of the disclosed inventive concept for attaching a crankshaft pendulum carrier to a crankshaft. In FIG. 14, a perspective view of a crankshaft assembly according to the fourth preferred embodiment of the disclosed inventive concept is generally illustrated as 200. The crankshaft assembly 200 includes a crankshaft 202 having main journals 204 and 204'. The main journals 204 and 204' are integrally formed as part of the crankshaft 112 and are restrained within the engine block (not shown) by crankshaft bearings (not shown). A connecting rod (not shown) is attached as is known in the art to a connecting rod journal 206 by a rod bearing (not shown).

To each side of the connecting rod journal 206 is provided a spaced apart pair of crankshaft webs 208 and 208'. The crankshaft webs 208 and 208' include pendulum carrier engagement portions for attachment of pendulum carriers according to the disclosed inventive concept. Particularly, a pendulum carrier engagement portion 210 is formed at one end of the crankshaft web 208. A pendulum carrier engagement portion 212 is formed at one end of the crankshaft web 208'.

The pendulum carrier engagement portion 210 includes a deck 214 and two lateral attachment bosses 216 and 216'. The pendulum carrier engagement portion 212 includes a deck 218 and two lateral attachment bosses 220 and 220'.

A one-piece, cold forged steel pendulum carrier 222 includes a pair of pendulum attachment ears 224 and 224'. The pendulum carrier 222 further includes attachment arms that extend outward for engagement with the engagement portion of the crankshaft web. As illustrated in FIG. 14, the pendulum carrier 222 includes an attachment arm 226 having a mechanical fastener, such as bolt 228.

Attachment of the pendulum carrier 222 to the engagement portion 210 occurs when the installer slips the pendulum carrier 222 over the engagement portion 210 such that the pendulum carrier 222 is flush against the deck 214 and the attachment arm 226 engages the attachment boss 216'. The curved surface of the attachment boss carries the load of the pendulum assembly. No drilling of the web is required.

Fifth Embodiment

Referring to FIGS. 15 through 18, a fifth embodiment of the disclosed inventive concept for attaching a pendulum carrier to a crankshaft is illustrated. Particularly, and referring to FIG. 15, a portion of a crankshaft assembly, generally illustrated as 230, is shown. The crankshaft assembly 230 includes a crankshaft 232 having a connecting rod journal 234. A connecting rod (not shown) is attached to the connecting rod journal 234 as is known in the art.

Figure 15:
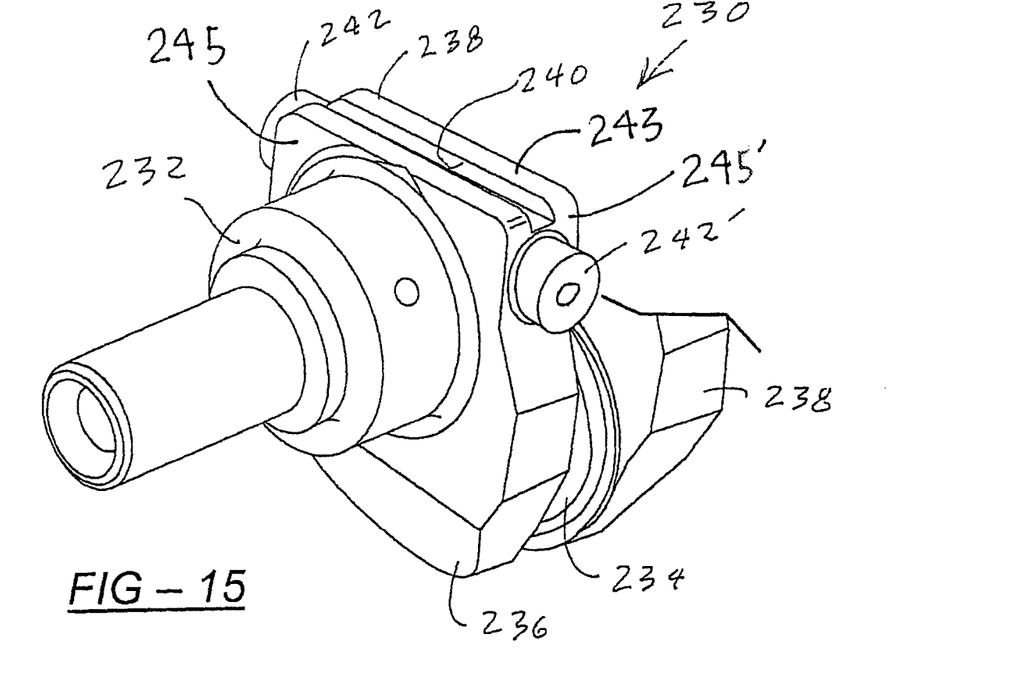
FIG. 15 illustrates a perspective view of a portion of a crankshaft to which a pendulum carrier may be attached according to a fifth preferred embodiment of the disclosed inventive concept.

To each side of the connecting rod journal 234 is provided a spaced apart pair of crankshaft webs 236 and 236'. The crankshaft webs 236 and 236' include pendulum carrier engagement portions for attachment of pendulum carriers according to the disclosed inventive concept. As shown in FIG. 15, a pendulum carrier engagement portion 238 is formed at one end of the crankshaft web 236. The pendulum carrier engagement portion 238 includes a machined carrier-receiving groove 240 (machined into the cast face 243 of the pendulum carrier engagement portion 238) formed between carrier attachment sides 245 and 245' and machined attachment bosses 242 and 242'.

A cold forged steel pendulum carrier 244 includes a pair of pendulum attachment ears 246 and 246'. The pendulum carrier 244 further includes attachment arms 248 and 248' that extend downward for engagement with the machined attachment bosses 242 and 242' of the pendulum carrier engagement portion 238 of the crankshaft web 236. The attachment arms 248 and 248' may be welded to the carrier 244.

Figure 16:
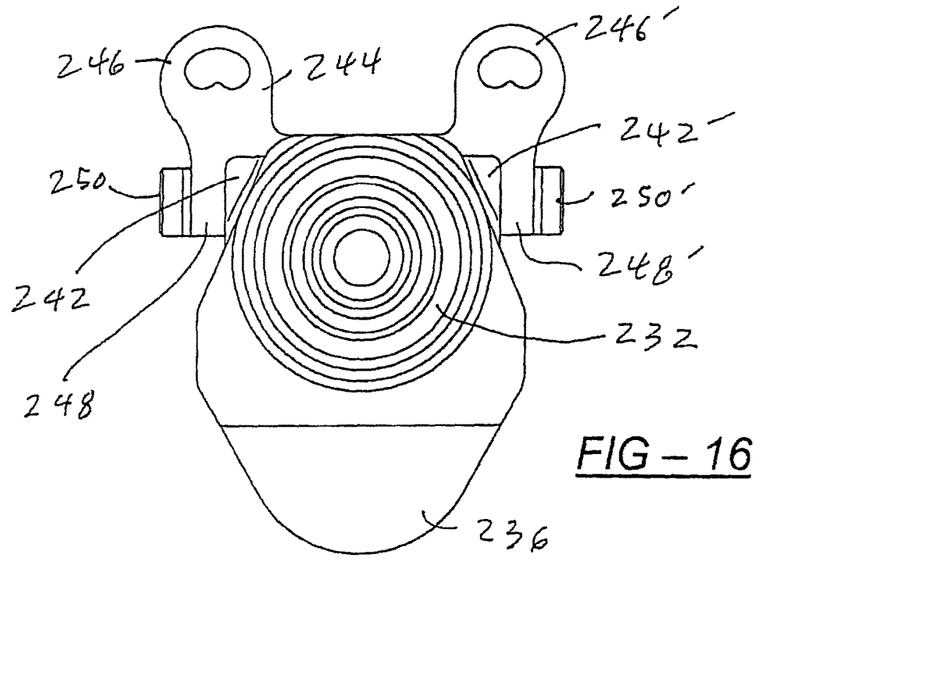
FIG. 16 is an end view of the crankshaft shown in FIG. 15 illustrating the pendulum carrier attached to the crankshaft.

On assembly, the pendulum carrier 244 is positioned onto the engagement portion 238 such that a portion of the pendulum carrier 244 is slotted into the machined groove 240 and the attachment arms 248 and 248' are positioned respectively over the attachment bosses 242 and 242' as illustrated in FIG. 16. Thereafter, mechanical fasteners, such as shoulder bolts 250 and 250', are used to fix the pendulum carrier 244 to the pendulum carrier engagement portion 238 of the crankshaft web 236. As an alternative to shoulder bolts, mechanical attachment may also be achieved by use of rivets or pressed pins.

Figure 17:
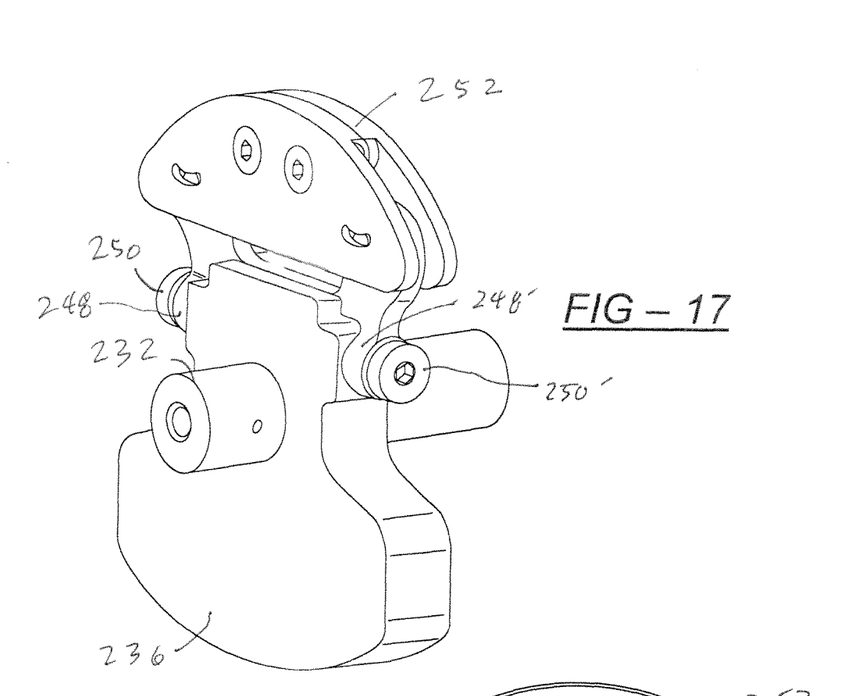
FIG. 17 is a perspective view of the crankshaft pendulum of the fifth preferred embodiment attached to a crankshaft and having a pendulum attached thereto.
Figure 18:
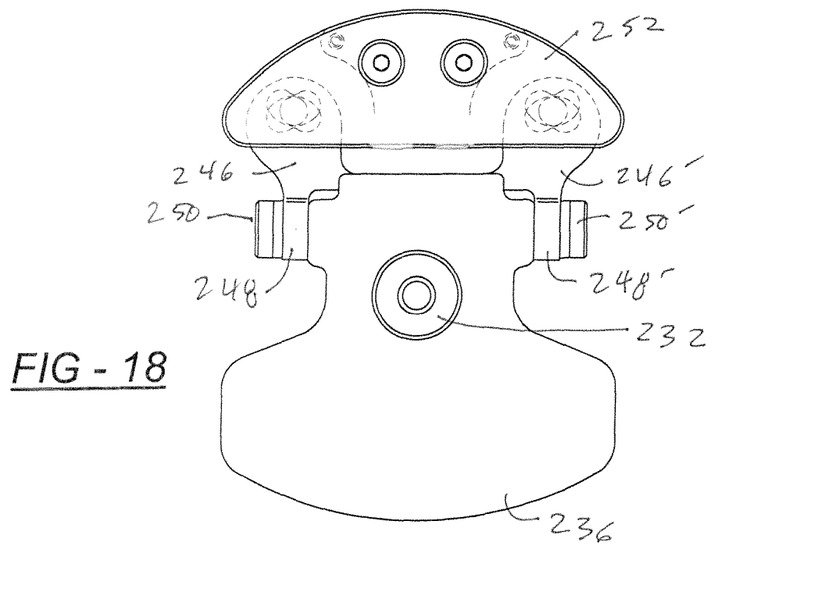
FIG. 18 is an end view of the crankshaft pendulum of the fifth preferred embodiment attached to a crankshaft and having a pendulum attached thereto.

FIGS. 17 and 18 respectively illustrate perspective and end views of the pendulum carrier 244 attached to the crankshaft web 236. In each figure, a pendulum 252 is shown movably attached to the pendulum carrier 244.

The pendulum carrier attachment arrangement according to the fifth preferred embodiment of the disclosed inventive concept provides several advantages over known approaches. First, the illustrated and described configuration provides a robust design with minimal manufacturing costs. Second, the crankshaft is of either as-cast or as-forged design with minimal machining except for the formation of the attachment bosses and the groove. Third, this design eliminates the need for pressed fits. Fourth, this design eliminates the need for long drillings. Fifth, this design provides axial support to the pendulum carrier, thereby eliminating axial movement during engine operation.

One skilled in the art will readily recognize from such discussion, and from the accompanying drawings and claims that various changes, modifications and variations can be made therein without departing from the true spirit and fair scope of the invention as defined by the following claims.

What is claimed is:

1. A vibrational absorber assembly for an internal combustion engine, the assembly comprising:
a pendulum assembly including a pendulum carrier and a pendulum, said carrier including a pair of pendulum attachment ears, each of said ears having a cycloid pathway formed therein for attaching said pendulum thereto;
a crankshaft having a web, said web having carrier attachment sides and a carrier attachment face, said face further having an elongated carrier-receiving groove into which a portion of said carrier is fitted, each of said sides including a pendulum carrier attachment boss; and
a fastener for attaching said pendulum carrier to said web.

2. The vibrational absorber assembly for an internal combustion engine of claim 1 wherein each of said attachment bosses includes a fastener hole formed therein.

3. The vibrational absorber assembly for an internal combustion engine of claim 1 wherein said carrier includes two engagement arms for attachment to said carrier attachment bosses.

4. The vibrational absorber assembly for an internal combustion engine of claim 3 wherein each of said engagement arms includes a fastener-passing hole.

5. The vibrational absorber assembly for an internal combustion engine of claim 1 wherein said carrier includes a flat body to which said engagement arms are attached.

6. The vibrational absorber assembly for an internal combustion engine of claim 5 wherein said flat body is cold forged.

7. The vibrational absorber assembly for an internal combustion engine of claim 1 wherein said fastener is selected from the group consisting of a pin, a bolt and a rivet.

8. A vibrational absorber assembly for an internal combustion engine, the assembly comprising:
a pendulum assembly including a pendulum carrier and a pendulum, said carrier including a pair of ears, each ear having a cycloid pathway formed therein for attaching said pendulum thereto;
a crankshaft having a web, said web having carrier attachment sides and a carrier attachment face, said face further having an elongated carrier-receiving groove into which a portion of said carrier is fitted; and
a fastener for attaching said pendulum carrier to said web.

9. The vibrational absorber assembly for an internal combustion engine of claim 8 further including a carrier attachment boss formed on each of said carrier attachment sides.

10. The vibrational absorber assembly for an internal combustion engine of claim 9 wherein each of said attachment bosses includes a fastener hole formed therein.

11. The vibrational absorber assembly for an internal combustion engine of claim 8 wherein said carrier includes two engagement arms for attachment to said carrier attachment bosses.

12. The vibrational absorber assembly for an internal combustion engine of claim 11 wherein each of said engagement arms includes a fastener-passing hole.

13. The vibrational absorber assembly for an internal combustion engine of claim 8 wherein said carrier includes a flat body to which said engagement arms are attached.

14. The vibrational absorber assembly for an internal combustion engine of claim 13 wherein said flat body is cold forged.

15. The vibrational absorber assembly for an internal combustion engine of claim 8 wherein said fastener is selected from the group consisting of a pin, a bolt and a rivet.

16. The vibrational absorber assembly for an internal combustion engine of claim 15 wherein said pin is a pressed-in pin.

17. The vibrational absorber assembly for an internal combustion engine of claim 15 wherein said bolt is a shoulder bolt.

18. A vibrational absorber assembly for an internal combustion engine, the assembly comprising:
a pendulum assembly including a pendulum carrier with a pair of attachment arms and a pendulum, said carrier including a pair of pendulum attachment ears, each of said ears having a cycloid pathway formed therein for attaching said pendulum thereto;
a crankshaft having a web, said web having carrier attachment sides and a carrier attachment face having a length defined by a first end and a second end opposed to said first end, said face further having an elongated carrier-receiving groove into which a portion of said carrier is fitted, a pendulum carrier attachment boss formed on each side, said attachment arms being positionable over said bosses and attachable thereto; and
a fastener for attaching said carrier to said web.

19. The vibrational absorber assembly for an internal combustion engine of claim 18 wherein said carrier includes a flat body to which said engagement arms are attached.

\* \* \* \* \*